Dec. 14, 1926.
W. O. HUFF
CROSSING SIGNAL
Filed March 13, 1926
1,610,948
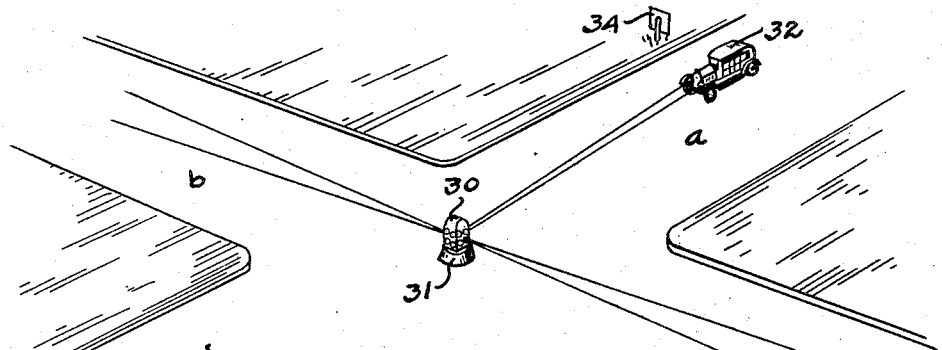
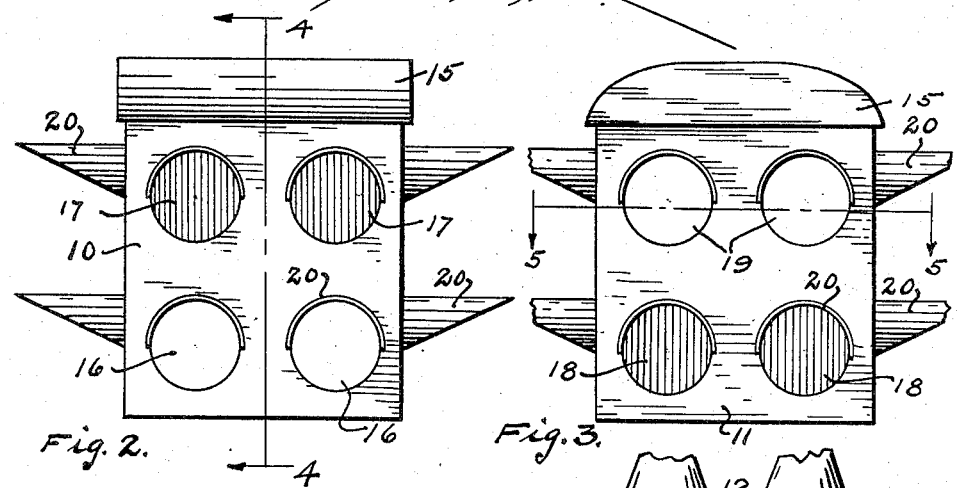
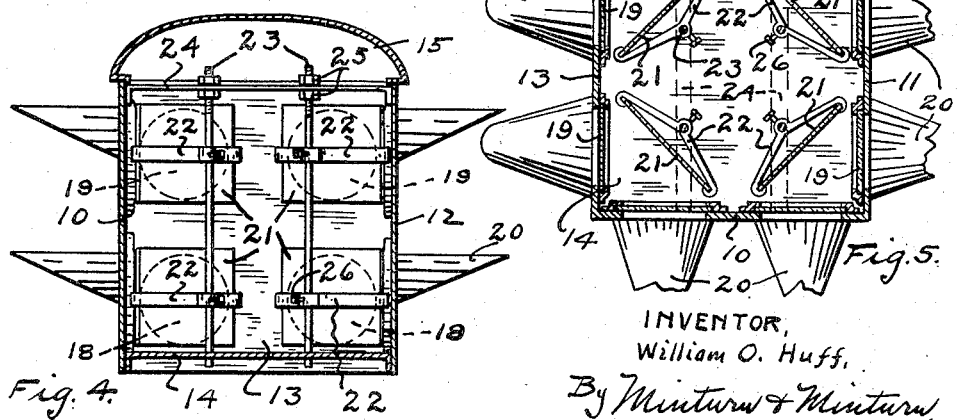
INVENTOR,
William O. Huff.
By Minturn & Minturn,
Attorneys.

Patented Dec. 14, 1926.

1,610,948

UNITED STATES PATENT OFFICE.

WILLIAM O. HUFF, OF SHELBY COUNTY, NEAR NEW PALESTINE, INDIANA.

CROSSING SIGNAL.

Application filed March 13, 1926. Serial No. 94,379.

This invention relates to a signal for the purpose of warning vehicles approaching a highway crossing that another vehicle is also approaching the crossing from a different angle, and relates particularly to signal means automatically operated by the approach of a vehicle without the employment of either or both a lamp or moving mechanism within the signal.

The signal comprising this invention is operative only by the reflection of the light directed from lamps on an approaching vehicle, and consequently is operative in sections of the country remote from a source of electricity and requires no attention to maintain continuous operation. The signal costs nothing for maintenance, and the original cost of production and installation is very low. The signal is equally as well adapted for use at the crossings of railroads over highways, as it is for use at the intersection of two or more highways.

In describing the invention, reference is made to the accompanying drawing showing one specific embodiment of the invention, in which drawing—

Fig. 1 is a perspective view in reduced scale of the intersection of two highways with a signal positioned for operation;

Fig. 2, a front elevation of the signal;

Fig. 3, a side elevation of the signal;

Fig. 4, a vertical section on the line 4—4 in Fig. 2; and

Fig. 5, a transverse section on the line 5—5 in Fig. 3.

Like characters of reference indicate like parts throughout the several views of the drawing.

The signal is formed as a hollow body with the side walls 10, 11, 12, and 13, the bottom 14, and the removable top or roof 15, resulting in a box-like formation.

The side-wall 10 has four apertures therethrough and a lens 16 is carried in each of the two lower apertures and a red-colored glass 17 is carried in each of the two upper apertures, as shown in Fig. 2.

The side-wall 11, likewise has four apertures correspondingly therethrough, but carries a red-colored glass 18 in each of the lower apertures and a clear lens 19 in each of the upper apertures, the positions of the colored glasses and the lenses being interchanged from those in the side wall 10. The side-wall 12 corresponds exactly to the side-wall 10 by having the lenses 16 and colored glasses 17 carried in the same relative positions, and similarly, the side-wall 13 corresponds exactly to the side-wall 11 in regard to the positions of the lenses 19 and colored glasses 18.

Hoods or visors 20 project from over each of all the lenses and colored glasses to prevent the rays of the sun from striking either.

Within the four walls of the signal is carried a plurality of mirrors 21, here shown as eight in number. Each mirror 21 is mounted on a bracket 22 adapted to slidingly receive therethrough a vertical rod 23 such that two mirrors 21 are carried in vertical planes by each rod 23. The rods are fitted through holes in the bottom 14 and are suspended by the cross-pieces 24 between the walls 10 and 12, by means of the nuts 25 screw-threadedly carried on the rods 23 as a means of vertical adjustment of the rods 23 as well as a means of locking the rods 23 in position.

Each mirror bracket 22 has a set-screw 26 as a means of locking the bracket 22 on the rod 23. The bracket may be slid up and down the rod 23 to get the desired vertical position, and may also be revolved about the rod 23 to obtain the necessary radial position of the mirror 21.

Referring particularly to Figs. 4 and 5, a mirror 21 is carried immediately back of each lens 19 such that light coming through the lens is focused on the two mirrors 21 and reflected out through the red-colored glasses 17. Similarly, mirrors 21 are arranged between the other corresponding lenses and glasses, and reference is now made to Fig. 1 in explaining the operation of the signal.

The signal generally designated by the numeral 30 is shown mounted on a concrete base 31 in the center of the intersection of the two highways $a$ and $b$, and a vehicle 32 is coming down the road $a$ toward the intersection. The light from the lamps of the vehicle 32 strikes the signal 30 such that the light passes through the lenses 16 or 19, depending upon which side of the signal is toward the vehicle. The light is reflected by the mirrors 21 to the right and the left in reference to the vehicle through the red-colored glasses 17 or 18 such that a red beam of light is directed each way from the intersection in the highway $b$ as a warning to any vehicle that may be approaching the intersection on the highway $b$. Similarly, a vehicle approaching the intersection by the road *b* would cause a red beam of light to be directed each way in the highway *a*, and thus a vehicle approaching by either road would give warning to the other of its approach.

For daylight operation a sign 34 is positioned along each highway *a* and *b* some distance back from the intersection to direct the vehicle operator to switch on his lights to operate the signal 30.

The signal is particularly advantageous when there is not a continuous flow of traffic, and when a vehicle is approaching the intersection and no second vehicle is approaching from the side road, the first vehicle may pass the intersection without receiving a "stop" signal, as he might receive in the heretofore mechanically timed and operated signal.

While the invention has been fully described in one particular form, it is not desired to be limited to such a specific structure, as the lenses may be varied in number and shape, and similarly, the reflecting mirrors may assume various shapes to obtain proper reflection, and the means of adjusting the mirrors may be varied, all without departing from the spirit of the invention.

I claim:

A crossing signal comprising a front housing wall; a lens in the front wall; a color-screen in the front wall; housing walls adjoining the front housing wall; a lens in each of the said adjoining walls; a color-screen in each of the said adjoining walls; said lenses and screens in the said adjoining walls being alternately interchanged so as to have a color screen at the same vertical elevation in one wall as are the lenses in each of the two adjoining walls; and mirror means for reflecting light coming through the lenses out through the color-screens, and means for adjusting the reflecting angle of said mirror means.

In testimony whereof I affix my signature.

WILLIAM O. HUFF.